US011926160B2

(12) United States Patent
Garcia Alvarez et al.

(10) Patent No.: US 11,926,160 B2
(45) Date of Patent: Mar. 12, 2024

(54) EVALUATING SURFACES

(71) Applicant: Hewlett-Packard Development Company, L.P., Spring, TX (US)

(72) Inventors: Ana Cristina Garcia Alvarez, Sant Cugat del Valles (ES); Maurizio Bordone, Sant Cugat del Valles (ES); Alexander Jose Perez Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 234 days.

(21) Appl. No.: 17/416,553

(22) PCT Filed: Apr. 26, 2019

(86) PCT No.: PCT/US2019/029418
§ 371 (c)(1),
(2) Date: Jun. 21, 2021

(87) PCT Pub. No.: WO2020/219076
PCT Pub. Date: Oct. 29, 2020

(65) Prior Publication Data
US 2022/0080734 A1    Mar. 17, 2022

(51) Int. Cl.
*B41J 2/165* (2006.01)
*G01N 21/31* (2006.01)
*G01N 21/88* (2006.01)

(52) U.S. Cl.
CPC ........ *B41J 2/16535* (2013.01); *G01N 21/314* (2013.01); *G01N 21/8806* (2013.01); *B41J 2002/1655* (2013.01); *G01N 2021/3181* (2013.01); *G01N 2021/8845* (2013.01)

(58) Field of Classification Search
CPC .......... B41J 2/16535; B41J 2002/1655; G01N 2021/3181; G01N 2021/8917
See application file for complete search history.

(56) References Cited

U.S. PATENT DOCUMENTS

| 5,264,904 A | 11/1993 | Audi et al. |
| 5,949,448 A | 9/1999 | Man et al. |
| 7,712,862 B1 | 5/2010 | Campillo et al. |
| 7,969,565 B2* | 6/2011 | Stober .................. G01N 21/255 |
| | | 356/600 |
| 8,733,882 B2 | 5/2014 | Yudasaka et al. |
| 9,676,202 B2 | 6/2017 | Leighton et al. |
| 2003/0169310 A1 | 9/2003 | Arquilevich et al. |

(Continued)

FOREIGN PATENT DOCUMENTS

WO    WO-2014181554 A1    11/2014

*Primary Examiner* — Sharon Polk

(57) ABSTRACT

In an example, a surface inspection apparatus includes a light source to illuminate a portion of a surface in a print apparatus, a light detection apparatus and processing circuitry. The light detection apparatus may receive diffusely reflected light and specularly reflected light from the portion of the surface, and may comprise a detection element for detecting the specularly reflected light. The processing circuitry may comprise a comparison module to determine a relationship between an intensity of the detected diffusely reflected light and the detected specularly reflected light and a quality module to evaluate if the surface meets a quality criterion based on the relationship.

14 Claims, 7 Drawing Sheets

(56) References Cited

U.S. PATENT DOCUMENTS

| | | |
|---|---|---|
| 2006/0127113 A1 | 6/2006 | Sato |
| 2012/0306957 A1 | 12/2012 | Paulik et al. |
| 2012/0315056 A1 | 12/2012 | Muroi et al. |
| 2013/0083324 A1* | 4/2013 | Wilhelm ................ G01N 21/93 356/431 |
| 2015/0146120 A1 | 5/2015 | Maida et al. |
| 2016/0197310 A1 | 7/2016 | Kubota et al. |

* cited by examiner

EVALUATING SURFACES

BACKGROUND

Print apparatus may generate an image on a substrate by applying printing liquid such as inks, overcoats, fixers, treatment and the like to the substrate, for example by ejecting printing liquid from nozzles of a printhead. However print quality can deteriorate over time due to contaminants, such as particles or fibres, or dry print liquid causing blockage of a nozzle. Some print apparatus use a cleaning surface, which may be referred to as a 'web wipe', which may be a fabric or textile, to wipe the printheads to remove contaminants and to maintain health of the printheads, thereby maintaining print quality.

BRIEF DESCRIPTION OF DRAWINGS

Non-limiting examples will now be described with reference to the accompanying drawings, in which.

DETAILED DESCRIPTION

In some print apparatus, for example inkjet printers, dye sublimation printers and some additive manufacturing apparatus, printing liquid is ejected through nozzles, for example in a printhead, Such nozzles may have a small size, for example in the range of 5 µm to 30 µm, and therefore may become blocked or partially blocked by contaminants reducing the quality of prints generated by the printhead. Such blockages can cause misdirection of printing liquid drops, breaking of printing liquid drops and generation of unwanted printing liquid drops on a printed surface resulting in print quality issues. In examples of additive manufacturing apparatus, the printed surface may comprise a layer of powder-like or granular material, which may be caused to solidify by the application of a binding or curing agent or in some examples a printing liquid which may absorb energy when irradiated such that the underlying material to which the printing liquid is applied may be caused to melt and thereafter fuse.

To reduce print quality issues, a print apparatus may use a cleaning surface, which may be referred to as a 'web wipe'. Care may be taken when selecting a material for use as a cleaning surface, as some materials can release fibres into the print apparatus which may themselves contaminate or block the nozzles of the printhead. Fibres on a printhead may also cause unwanted marks on a print media because printing liquid may accumulate around the fibre until the weight of the printing liquid is enough to drop from the fibre onto a substrate being printed. Contamination by fibres may spread throughout components of a print apparatus due to movement of components such as a carriage or service station, and therefore can reach the printheads and other parts of the print apparatus. Some locations in print apparatus are difficult to access and therefore it is difficult remove the contamination and clean the print apparatus completely, resulting in contamination remaining in the print apparatus even after a defective cleaning surface is replaced.

Print quality can also be affected by the thickness of the cleaning surface. For example, a thicker cleaning surface may exert a higher pressure on the printhead. Too much pressure can (in some examples over time) result in damage to a print apparatus (for example, damage to a printhead thereof) and/or too little pressure may result in reduced cleaning efficacy. Moreover, while thinner cleaning surfaces may be more prone to tear or break thicker cleaning surfaces may absorb more fluids which can re-enter nozzles potentially causing clogging.

Figure 1:
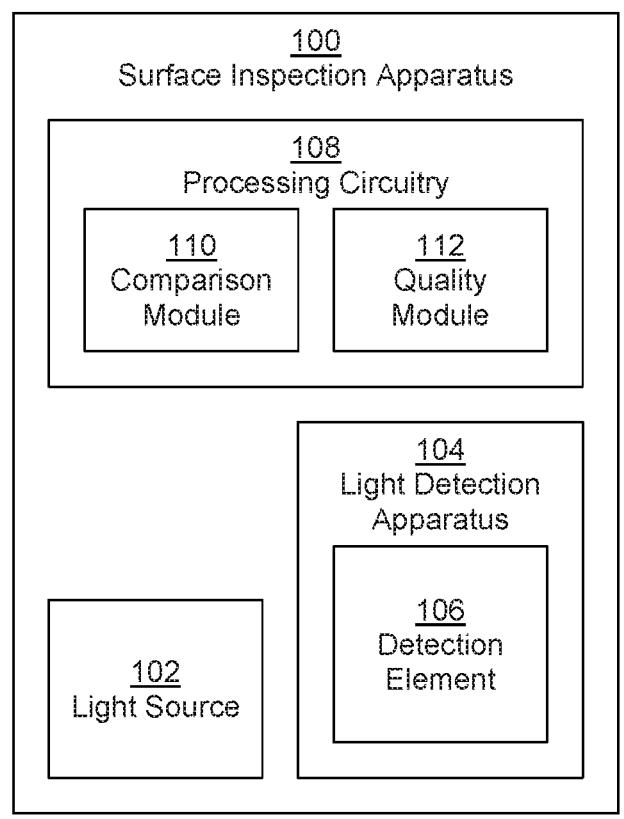
FIG. 1 is a simplified schematic representation of a surface inspection apparatus.

FIG. 1 is an example of a surface inspection apparatus 100. The surface inspection apparatus 100 comprises a light source 102 to illuminate a portion of a surface in a print apparatus, and a light detection apparatus 104 to receive diffusely reflected light and specularly reflected light from the portion of the surface. The surface in the print apparatus may be a surface of the print apparatus, or it may be a surface of a replaceable or consumable component of the print apparatus, for example a print media or a cleaning surface such as a web wipe.

As used herein, specularly reflected light refers to the portion of incident radiation which is reflected from a surface at an angle equal to the angle of incidence of the incident radiation, wherein the incident angle is the angle between the incident ray and a normal to the surface. As used herein, diffusely reflected light refers to the portion of incident light which is scattered from a surface at many angles. For some materials the intensity of diffusely reflected light is similar at all reflection angles.

The light source 102 may emit radiation at any appropriate wavelength, wavelengths or range of wavelengths. In some examples the light source 102 may emit radiation in the visible region of the spectrum, for example blue, red, green, or orange light, or any combination of such colors. In other examples the light emitted may be outside of the visible spectrum, for example it may be infrared or ultraviolet light.

The light detection apparatus 104 in this example comprises a detection element 106 for detecting the specularly reflected light. In some examples the detection element 106 comprises an angle-resolved light detector positioned relative to the light source 102 such that it can detect the light reflected at a predetermined range of angles, wherein that range of angles is likely to include the specularly reflected light if the apparatus is operating within nominal parameters.

In some examples the detection element 106 may detect light at a narrow range of angles. In other examples, detection element 106 may detect light at a wider range of angles and may identify an angle at which specular reflection has occurred based on the relative intensity at different angles. The detection element 106 may also receive diffuse light, therefore the light detection apparatus 104 may comprise another detection element or a plurality of additional detection elements, which may also be angle-resolved detection elements, and/or which may be positioned such that specular reflections will not generally be incident thereon.

The surface inspection apparatus 102 further comprises processing circuitry 108 comprising a comparison module 110 and a quality module 112. In use of the apparatus 102, the comparison module 110 determines a relationship between an intensity of the detected diffusely reflected light and the detected specularly reflected light, and the quality module 112 evaluates if the surface meets a quality criterion or criteria based on the relationship. The intensity of the diffusely reflected light may be determined directly by subtracting the detected diffusely reflected light detected by the light detection apparatus 104 (for example by another detector element thereof) from the light detected at the detection element 106, which may isolate the contribution of the specularly reflected light from the diffusely reflected light. However, even if this subtraction is not performed, the relationship between the detected diffusely reflected light and the detected specularly reflected light may be inferred as described in greater detail below.

As is explained in greater detail below, the relationship may provide an indication of the distance between the surface inspection apparatus and the surface. If the indication differs from what is expected, then this may be indicative of an issue with the surface. For example, in the case where the surface is a cleaning surface such an issue may be incorrect thickness of the cleaning surface or the presence of defects on the cleaning surface.

Figure 2A:
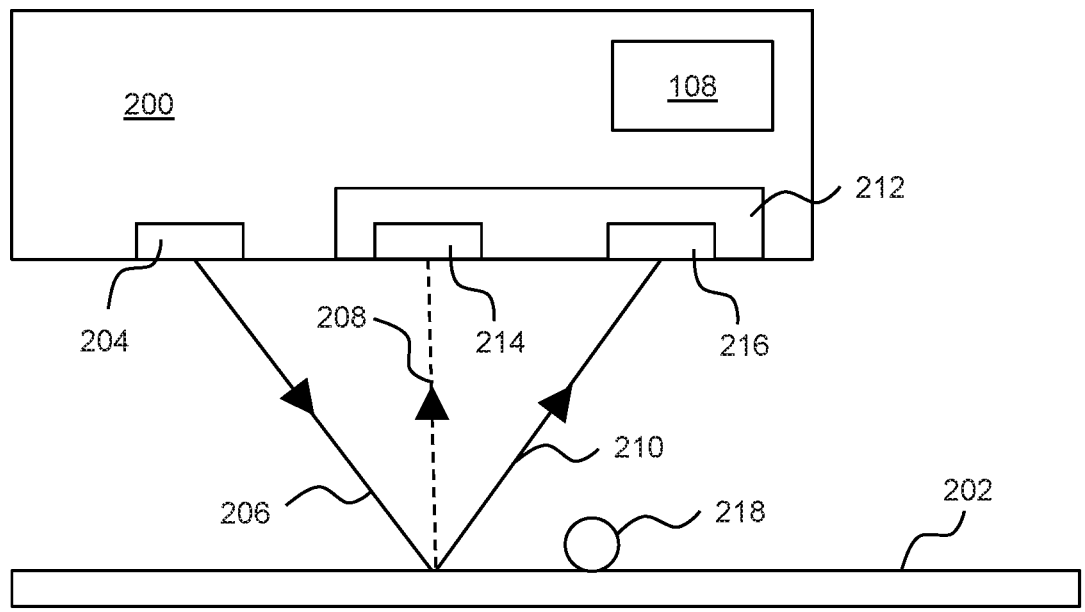
FIGS. 2A and 2B are schematic representations of a surface inspection apparatus inspecting a surface.
Figure 2B:
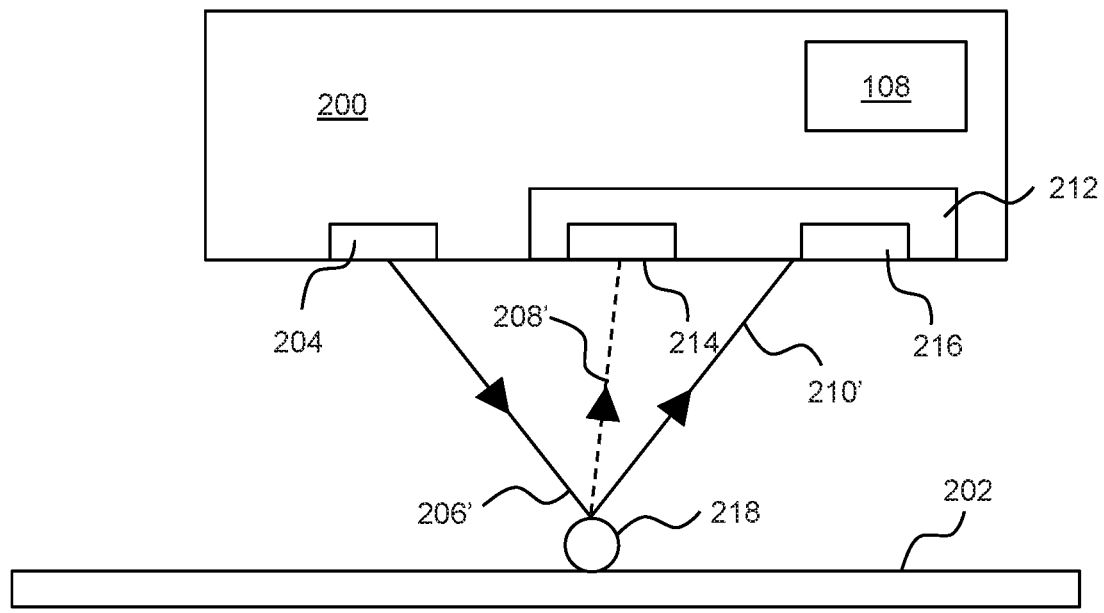

FIGS. 2A and 2B show examples of a surface inspection apparatus 200 inspecting a surface of a substrate 202. The light source 204 emits an incident ray of light 206 towards a portion of the surface of the substrate 202. The light is reflected from the surface as both specularly reflected light and diffusely reflected light. The diffusely reflected light is reflected in substantially all directions above the substrate 202, however for clarity a single diffusely reflected ray 208 is shown in the figures. A specular ray 210 is also reflected from the surface of the substrate 202 at an angle equal to the angle at which the incident ray strikes the surface of the substrate 202.

The surface inspection apparatus 200 comprises light detection apparatus 212. In this example the light detection apparatus 212 of the light detection apparatus 212 comprises a first light detector 214 to receive non-specularly, or diffusely, reflected light from the portion of the surface of the substrate 202, In this example, the first light detector 214 is an angle-resolved detection element (i.e. it is configured so as to receive light reflected at a predetermined relatively narrow range of angles, and not at a wider range of angles), although in other examples the first light detector 214 may receive light over a wider range of angles. The light detection apparatus 212 also comprises a second light detector 216 to receive specularly reflected light from the portion of the surface of the substrate 202. The second light detector may 216 have any of the properties described in relation to the detection element 106 described in relation to FIG. 1. In use of the apparatus 200 in this example, as diffuse reflections occur at substantially all angles, the second light detector 216 will also receive diffusely reflected light from the surface of the substrate 202.

The first light detector 214 and/or the second light detector 216 may be light-to-voltage converters, such as a photodiode or the like. In some examples the first light detector 214 may receive light at a wider range of angles that the second light detector 216, which may allow it to acquire a sample of at least substantially diffusely reflected light which could for example be averaged or otherwise may reduce noise in the obtained sample.

As diffusely reflected light is reflected in multiple directions above the surface 202, the first light detector 214 may have any position facing towards the substrate 202 at which the intensity of expected specular reflections are low or negligible, however it is in this example arranged at the midpoint between the light source 204 and the second light detector 216, such that it is above the portion of the substrate 202 which is illuminated by the light source 204. The first light detector 214 is unlikely to receive specularly reflected light in such examples.

In this example, the surface inspection apparatus is arranged such that when the substrate 202 is of a predetermined nominal thickness, the specularly reflected ray 210 is directly incident on the centre of the second light detector 216. Therefore the second light detector 216 will detect a first, nominal, intensity of light when the substrate 202 is of this nominal thickness, however if the substrate 202 is thicker or thinner, or defects (e.g. loose fibres) are present on the surface of the substrate 202, then the specularly reflected ray 216 will not be directly incident on the centre of the second light detector 216 and the second light detector 216 will measure a second intensity of radiation, which is lower than the first intensity. As there will be a (relatively small) range of angles in the specularly reflected light, assuming the change in the distance between the apparatus 200 and the surface is not too great, there will likely be a signal representing specularly reflected light, but this signal may be reduced in intensity as a greater portion thereof may fall outside the angular resolution of the second light detector 216. In other examples, the second light detector 216 may comprise a number of detection elements and the intensity of light detected at each of the elements may vary based on the thickness and/or defects on the substrate 202. Monitoring the intensity, and changes therein (in some examples, changes from a nominal intensity), may provide an indication of the distance between the surface of the substrate 202 (including any defects) and the surface inspection apparatus 200.

In some examples the intensity of the diffusely reflected light may be determined directly by subtracting the detected diffusely reflected light detected by the first light detector 214 from the light detected at the second light detector 216, which may isolate the contribution of the specularly reflected light from the diffusely reflected light. However, even if this subtraction is not performed, the relationship between the detected diffusely reflected light and the detected specularly reflected light may be inferred.

In the example of FIGS. 2A and 2B, a defect 218 is located on the surface of the substrate 202. The defect 218 in this example may be a dust particle, a fibre, dried printing liquid, or any other contaminant on the surface of the substrate 202 but in other examples, a defect may be a variation in thickness in the substrate 202. In FIG. 2A, the defect 218 does not interfere with the light rays 206, 208, 210, however in FIG. 2B the surface inspection apparatus 200 is moved relative to the surface (which may in practice be a result of the substrate 202 moving past the inspection apparatus 200 as discussed below) such that the incident ray 206' strikes the defect 218 causing the specularly reflected ray 210' to be deflected such that it is not directly incident on the second light detector 216. Therefore, when the defect 218 is present on the substrate 202 and in the path of the incident ray 206' the second light detector 216 will measure a reduced intensity. As the diffusely reflected light has a small dependence on angle, the first light detector 214 will measure a similar intensity when either the defect is present or absent. Therefore, by comparing the output of the first light detector 214 with the output from the second light detector 216 it is possible to determine if there is a defect present on the surface of the substrate 202 or if the thickness of the substrate 202 deviates from the nominal thickness. Moreover, the change in the intensity of light detected at the second light detector 216 may be indicative of the change in the distance between the surface including the defect 218 and the surface of the substrate 202 without the defect.

In FIGS. 2A and 2B, the surface inspection apparatus 200 is shown to move relative to the substrate 202 to inspect different regions of the surface of the substrate 202. In some examples the surface may be moveable, or both the surface inspection apparatus 200 and the substrate 202 may be moveable to allow inspection. For example the substrate 202 may be movable in a first direction and the surface inspection apparatus 200 may be movable in a second direction perpendicular to the first direction, thereby allowing inspection of the surface of the whole substrate 202.

An example spacing between the surface inspection apparatus 200 and the substrate 202 may be around 6-8 cm. In practical examples, a variation in the spacing of the illuminated surface to the inspection apparatus 200 of less than 0.1 mm, for example in the range of 0.05 to 0.09 mm, or 0.07 to 0.09 mm may be detectable and characterisable (i.e. associated with a change in distance) (with an upper variation of around 5 to 7 mm being detectable and characterisable in the case of more extreme changes in the spacing).

Figure 3:
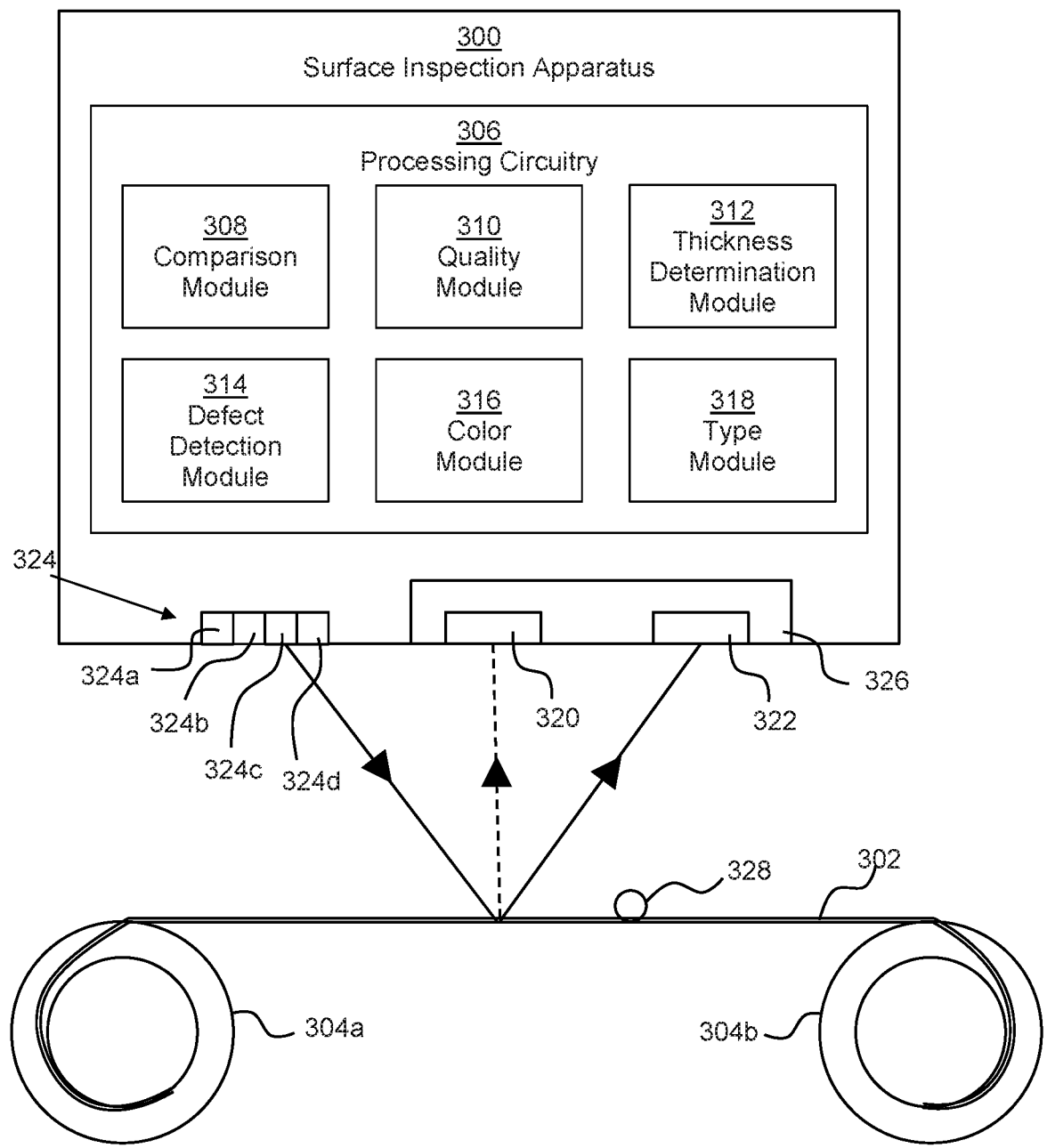
FIG. 3 is a schematic representation of another example surface inspection apparatus.

FIG. 3 is an example of a surface inspection apparatus 300. In this example the surface under inspection is a surface of a web wipe 302 for cleaning a printhead of a printing apparatus. Such a web wipe 302 may be a replaceable or consumable part of the print apparatus. In some examples the surface inspection apparatus 300 is movable relative to the web wipe 302, however in this example the web wipe 302 is mounted on spools 304a, 304b which are rotatable so that the web wipe 302 can move past the surface inspection apparatus 300 to allow inspection of a length of the web wipe 302. In an example print apparatus the web wipe may be used for cleaning of the printheads, which is achieved by moving the printhead so that it is in contact with the web wipe 302. The spools 304a, 304b are then rotated, for example by an electric motor; so that clean web wipe 302 is used each time a printhead contacts the web wipe to clean any contaminants from the printhead.

The surface inspection apparatus 300 also comprises processing circuitry 306. The processing circuitry 306 comprises a comparison module 308 and a quality module 310 which may have any of the features of the comparison module 110 and the quality module 112 described in relation to FIG. 1. In addition to the features described in relation to FIG. 1, and in use of the apparatus 300, the quality module 310 also determines if the web wipe 302 meets a quality criterion by determining a distance between the apparatus 300 and the portion of the surface of the web wipe 302 determined using the relationship determined by the comparison module 308.

In this example, the apparatus 300 further comprises a thickness determination module 312 which, in use of the apparatus 300, determines (for example, qualitatively in distance units such as millimetre or microns) the thickness of the of the web wipe 302 based on the determined distance between the apparatus 300 and the portion of the surface of the web wipe 302. The position of the underside of the web wipe 302 may be predetermined. For example, the web wipe 302 may rest on a fixed surface of the printing apparatus. Furthermore, the surface inspection apparatus 300 may be a fixed distance from the fixed surface within the printing apparatus. Therefore, the thickness of the web wipe 302 may be determined by the thickness determination module 312 by determining the difference between the distance from the surface inspection apparatus 300 to the fixed surface within the printing apparatus and the distance from the surface inspection apparatus 300 and the surface of the web wipe 302. The web wipe 302 may not rest on such a surface within the print apparatus in some examples, but the location of its underside may still be predetermined, for example its position may be determined by the position of the spools 304a, 304b, and so the thickness may be determined in a similar manner.

In this example, the surface inspection apparatus 300 further comprises a defect detection module 314 which, in use of the apparatus 300, detects a presence of a defect 328 on the surface of the web wipe 302 by detecting changes in the relative intensity of the diffusely reflected light and the detected specularly reflected light for different surface portions. Defects such as particles on the surface may be distinguished from changes in thickness in some examples as these may be associated with a relatively short length of the web wipe 302, whereas thickness changes may be associated with a relatively long length of the web wipe 302. The thickness determination module 312 and the defect detection module 314 may comprise part of the quality module 310.

The surface inspection apparatus 300 may monitor the web wipe 302 continuously or take samples at intervals as the surface of the web wipe 302 moves relative to the surface inspection apparatus 300. If an inspection is performed at a first portion of the web wipe 302 and the surface of the web wipe 302 is of nominal thickness and defect free, then the second detector 322 will measure a high intensity of specularly reflected light from the first portion of the web wipe 302, as described above in relation to FIG. 2A. The surface of the web wipe 302 may then be moved relative to the surface inspection apparatus 300 so that the surface inspection apparatus is directing light from the light source to a second portion of the surface of the web wipe 302. If a defect is located on the second portion of the surface of the web wipe 302 then the second light detector 322 will receive a reduced quantity of specularly reflected light (although it may still receive diffusely reflected light). Therefore, if there is a reduced intensity of light detected at the second light detector it may be determined that a defect 328 is present on the second portion of the surface of the web wipe 302. The light detected by the first light detector 320 may remain substantially unchanged between measurements at the first portion and the second portion of the surface of the web wipe 302. Therefore, a comparison between the output from the first light detector 320 and the second light detector 322 can provide an indication of the amount of specularly reflected light received at the second light detector 322.

As mentioned above, a type of defect may be characterised in some examples. For example, when the thickness changes the change of the output lasts longer and may change in a relatively smooth manner while a fibre on the web wipe 302 may cause rapid changes and shorter-lived changes in the output.

In this example, the apparatus 300 comprises a light source 324, which may have any of the attributes of the light sources 102, 204 described above. In this example, the light source 324 comprises an LED and more particularly a plurality of LEDs 324a-d. Each LED in the plurality of LEDs 324a-d produces a different color of light. For example, the plurality of LEDs may comprise four LEDs: a first LED 324a which emits blue light, a second LED 324b which emits green light, a third LED 324c which emits red light and a fourth LED 324d which emits orange light. Blue light may be light centered at a wavelength of 469 nm, green light may be light centered at a wavelength of 530 nm, red light may be light centered at a wavelength of 645 nm and orange light may be centered at a wavelength of 607 nm. Other numbers of LEDs and combinations of colors are also possible. The LEDs are controllable to turn off and on independently, so that the web wipe 302 can be illuminated by a single LED 324a-d or by any combination of LEDs. For example all LEDs may be turned on simultaneously to provide white light. As shown in FIG. 3 the LEDs 324a-d are arranged at different distances relative to the light detection apparatus 326, however in practice the LEDs 324a-d may be positioned to minimise the difference in distance between each LED 324a-d and the light detection apparatus 326, for example by arranging them in a linear or arcuate array perpendicular to a plane of the drawing in FIG. 3 such that the length of the path a ray follows from each respective LED 324a-d to a light detector is substantially equal. The color selected may depend on the color of the web wipe and may be chosen to ensure a high signal level. Where a web wipe is white (as may be the case), a range of colors may result in a good signal level.

One or more light sources may be provided to supply light in the visible spectrum, for example red light, green light, blue light, orange light or white light. In some examples the LED may provide infrared light or ultraviolet light. However, in some examples, sensing apparatus 300 may comprise optical filters to reject wavelengths outside a predetermined waveband. The blocked wavebands may include at least part of the infrared wavebands as infrared light may be generated by other sources in a print apparatus. The first light detector 320 and/or the second light detector 322 may be provided with filters which correspond to the color of light produced by the light source and block light of other colors. For example, as mentioned above if the LED produces visible light, then the filter may block infrared or ultraviolet light, thereby reducing noise and light from unwanted sources reaching the light detectors 320, 322.

The light source 324 may be a directional light source such that the portions of the surface which are not under inspection are substantially unilluminated. Directionality may be achieved through use of a lens, opaque shielding, a focusing mirror or use of a light source which is inherently directional such as a laser.

In this example the surface inspection apparatus 300 further comprises a color module 316 to determine a color of a substrate or printing liquid on a printed substrate based on an output of the light detection apparatus 326. The surface inspection apparatus 300 in this example additionally comprises a type module 318 to determine a type of the substrate based on the output of the light detection apparatus 326.

In some examples the light detection apparatus 326 may comprise additional light detectors. A detection element of the light detection apparatus 326 may comprise an array of light detectors, allowing a more accurate determination of the distance between the surface of the web wipe 302 and the surface inspection apparatus 300. In this example specularly reflected light from the surface will arrive at a different light detector of the array depending on the distance between the surface of the web wipe 302 and the surface inspection apparatus 300, thereby allowing a quantitative determination of the distance between the surface inspection apparatus 300 and the surface of the web wipe 302.

A plurality of LEDs of different colors allows the surface inspection apparatus 302 to determine the color of the portion of the surface under inspection. For example, if green printing liquid is present on the surface and the surface is illuminated with light from the green LED 324b then a relatively large amount of light will be reflected from the surface and the first light detector 320 and second light detector 322 will measure a high intensity of reflected light. In contrast if the same portion of the surface is illuminated with light from the red LED 324c a relatively small amount of light will be reflected as it will be absorbed by the green printing liquid on the surface. Therefore, the first light detector 320 and the second light detector 322 will detect a low intensity of reflected light from the portion of the surface. In this way the color module 316 of the surface inspection apparatus 300 may be used to determine the color of a surface. The surface inspection apparatus 300 may be used to inspect surfaces such as print media to determine their color, or inspect surfaces which have been printed on, such as printed media, to determine if the printing liquid is deposited in the correct position and/or if it is of the correct color, thereby determining if print quality issues exist.

The surface inspection apparatus 300 in this example may also determine properties of the of the web wipe 302 to determine the type of media present using the type module 318. For example, when a surface with high gloss is illuminated a relatively high proportion of light is specularly reflected and a relatively low portion of light is diffusely reflected. Conversely when a matt surface is illuminated a relatively high proportion of light is diffusely reflected and a relatively low proportion of light is specularly reflected. The comparison module 308 of the surface inspection apparatus 300 can determine the relative intensity of diffusely reflected light and specularly reflected light and therefore the type module 318 can be used to determine the gloss, or type, of media, i.e. whether the media is a glossy media or a matt media.

By using the same apparatus 300 for inspecting cleaning surfaces and printing surfaces or substrates instead of separate apparatus, the number of components in a print apparatus may be reduced.

Figure 4:
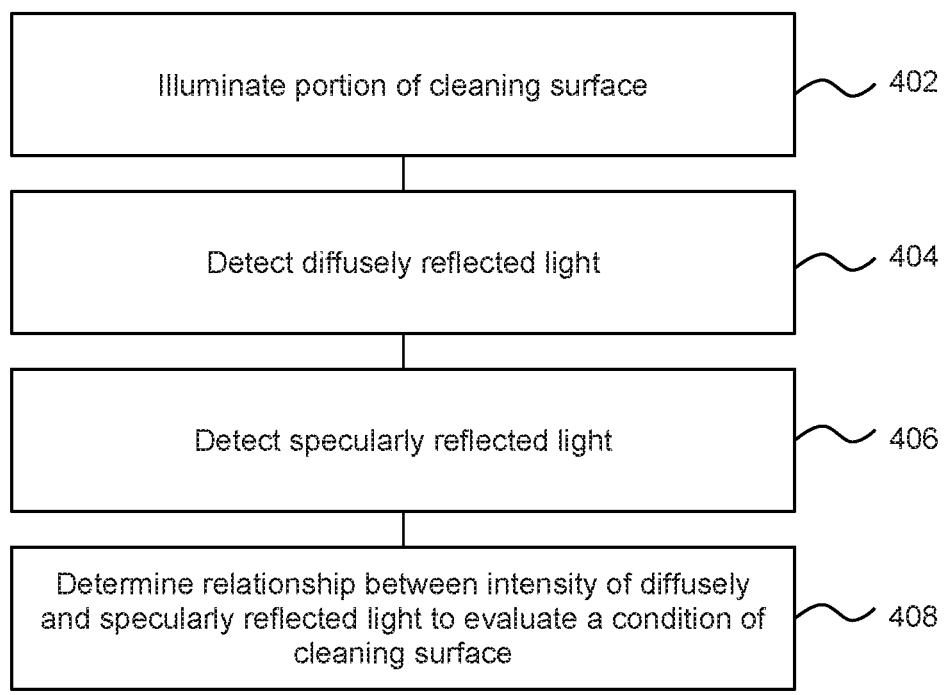
FIG. 4 is a flowchart of an example method of evaluating a surface.

FIG. 4 shows an example of a method, which may be a method of evaluating a surface. In this example block 402 comprises illuminating a portion of a cleaning surface in a print apparatus. The illumination may be provided by a light source, for example an LED or a plurality of LEDs as described above.

Block 404 comprises detecting diffusely reflected light from the illuminated portion. Detecting diffusely reflected light may be performed using a first light detector located at a position which is at a substantially different to the angle of incidence relative to the illuminated portion so that diffusely reflected light reaches the first light detector and specularly reflected light does not reach the first light detector.

Block 406 comprises detecting specularly reflected light from the illuminated portion. Detecting specularly reflected light may be performed using a second light detector located at a position which is at an angle equal to the angle of incidence relative to the illuminated portion so that specularly reflected light reaches the second light detector. As diffusely reflected light is reflected in all directions above the plane of the surface, the second light detector may also detect diffusely reflected light in addition to the detected specularly reflected light.

Block 408 comprises determining a relationship between intensity of the diffusely reflected light and intensity of the specularly reflected light to evaluate a condition of the cleaning surface. The evaluated condition may include at least one of a thickness of the surface, a distance to the surface, a surface roughness, a color, a presence of defects, a number of defects, thickness variations, gloss, a presence of fibres on the surface, and/or a type of defect (e.g. fibre or thickness variation). The evaluation may for example compare a thickness variation and/or a number of detected defects to a threshold to determine a measure of the quality of the surface, for example using the techniques discussed above.

Figure 5:
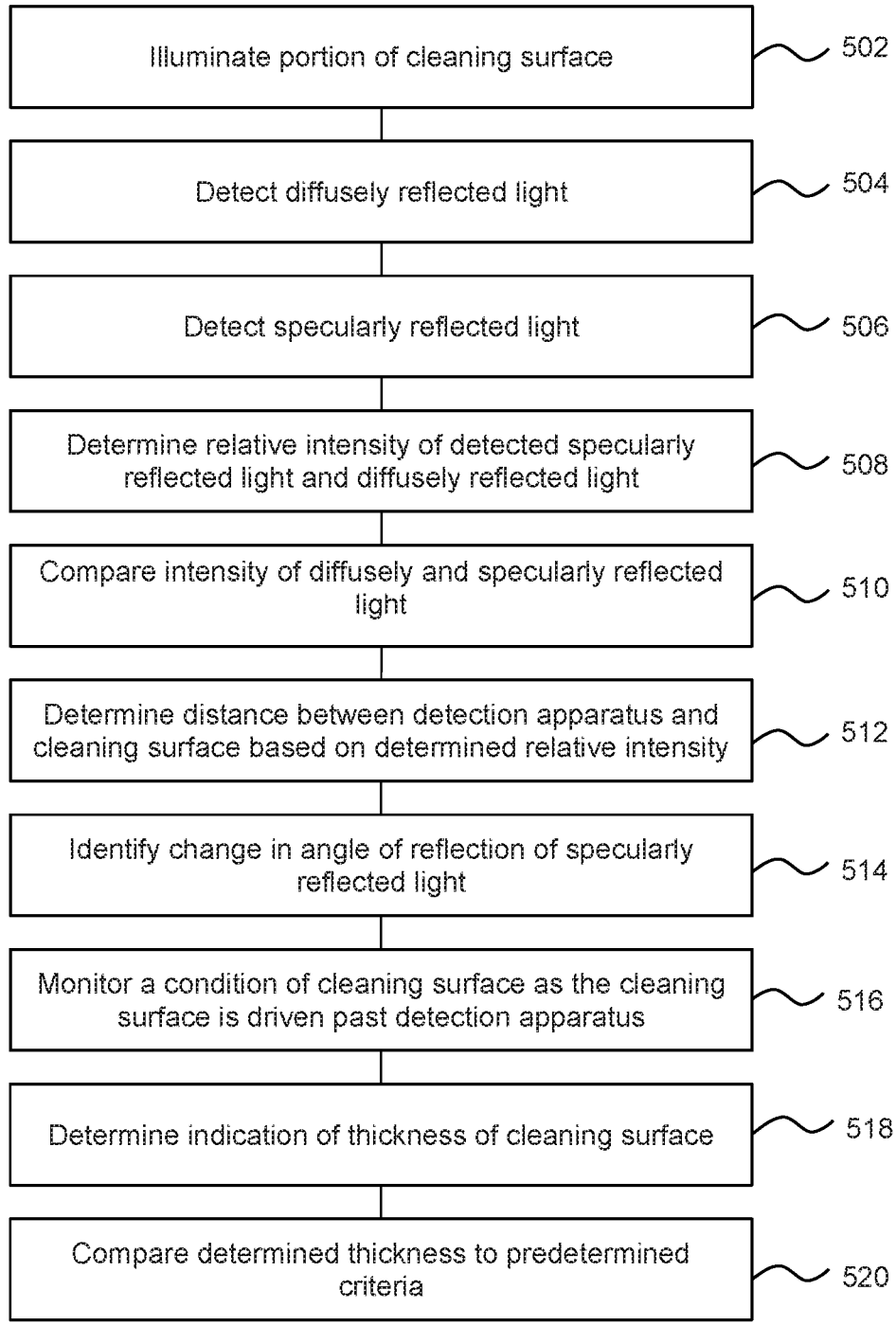
FIG. 5 is a flowchart of another example method of evaluating a surface.

FIG. 5 is an example of a method, which may be a method of evaluating a surface. In this example block 502 comprises illuminating a portion of a cleaning surface in a print apparatus. Block 504 comprises detecting diffusely reflected light from the illuminated portion. Block 506 comprises detecting specularly reflected light from the illuminated portion.

Block 508 comprises determining the relative intensity of the detected specularly reflected light and the diffusely reflected light. The relative intensity of specularly reflected light and diffusely deflected light may be determined by comparing the output of a first light sensor and second light sensor, wherein the first light sensor is located such that it receives diffusely reflected light and not specularly reflected light, and the second light sensor is located such that it receives both diffusely and specularly reflected light.

Block 510 comprises comparing the intensity of the diffusely reflected light and the intensity of the specularly reflected light to evaluate a condition of the cleaning surface.

Block 512 comprises determining a distance between a detection apparatus and the cleaning surface (and any defect thereon) based on the determined relative intensity. As describe above the relative intensity of the detected specular reflected light and diffuse reflected light will vary depending on the distance to the cleaning surface, and therefore a characteristic of the distance can be determined by comparing the relative intensities. This distance may for example be indicative of the presence of a defect or a change in thickness.

Block 514 comprises identifying a change in an angle of reflection of the specularly reflected light. A change in angle will cause a change in the intensity of the detected specularly reflected light. Therefore, a change in angle may be determined by detecting a change in the intensity of the specularly reflected light.

Block 516 comprises monitoring the condition of the cleaning surface as the cleaning surface is driven past a detection apparatus. In some print apparatus cleaning of a printhead is performed by positioning the printhead such that it is in contact with the cleaning surface. The cleaning surface is then moved to perform cleaning of the printhead, for example it may be driven by an electric motor. The same mechanism may be used to move the cleaning surface while it is under inspection by the surface inspection apparatus allowing a length, or the whole, of the cleaning surface to be inspected. The cleaning surface may be inspected continuously or sampled at distinct portions along its length. In other examples the surface inspection apparatus is driven to perform inspection of the cleaning surface. In some examples both the cleaning surface and the surface inspection apparatus are both driven. The cleaning surface may be driven in a first direction and the surface inspection apparatus may be driven in a second direction perpendicular to the first direction to achieve inspection of the surface in both directions. In other examples, the cleaning surface may be driven in a first direction and the surface inspection apparatus may be driven in a second direction parallel to the first direction.

Some web wipe manufacturing processes may cause an inherent variability in thickness, which may decrease the efficacy of cleaning. Therefore, detecting such variations may increase the lifespan of the apparatus being cleaned.

Block 518 comprises determining, based on the distance, an indication of a thickness of the cleaning surface. The underside of the cleaning surface may be a fixed distance from the surface inspection apparatus, and therefore the thickness of the cleaning surface may be determined by subtracting the distance from the surface inspection apparatus to the cleaning surface from the distance from the underside of the cleaning surface to the surface inspection apparatus.

Block 520 comprises comparing the determined indication of thickness to predetermined criterion or criteria. The predetermined criterion may be or relate to a target thickness, or a range of thicknesses. The predetermined criterion may be a measure of the variability in thickness, for example if the variations in thickness of the surface are greater than a threshold then it may be determined that the predetermined criterion is not met.

An action may be performed based on the comparison of the determined thickness to a predetermined criterion or criteria. For example, the predetermined criterion or criteria may comprise at least one of a range of thicknesses, a measure of the variation in thickness, and a threshold number and/or size of defect(s) present on the surface. If the comparison meets the predetermined criterion or criteria, the printing apparatus may continue to operate for example by using the cleaning surface to clean a printhead. If the predetermined criterion or criteria is not met then an alert or corrective action may be performed. For example, a user may be alerted by a visual or audible notification, or a print apparatus support service may be alerted by transmission of a message over a network, or the failure to meet the criterion may be recorded in a log, or the like. In some examples the printing apparatus may take a corrective action, for example if a portion of the cleaning surface is determined to not meet the predetermined criterion a second portion of the cleaning surface may be inspected to determine if it meets the predetermined criterion. The second portion may then be used to clean the printheads, without using the first portion which does not meet the predetermined criterion.

Figure 6A:
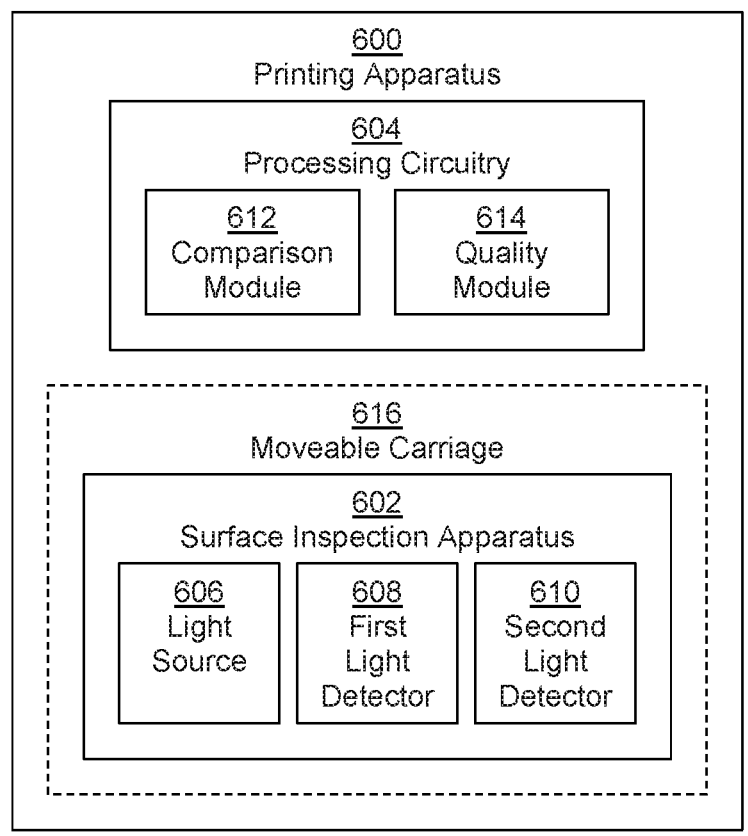
FIG. 6A is a simplified schematic representation of an example printing apparatus.
Figure 6B:
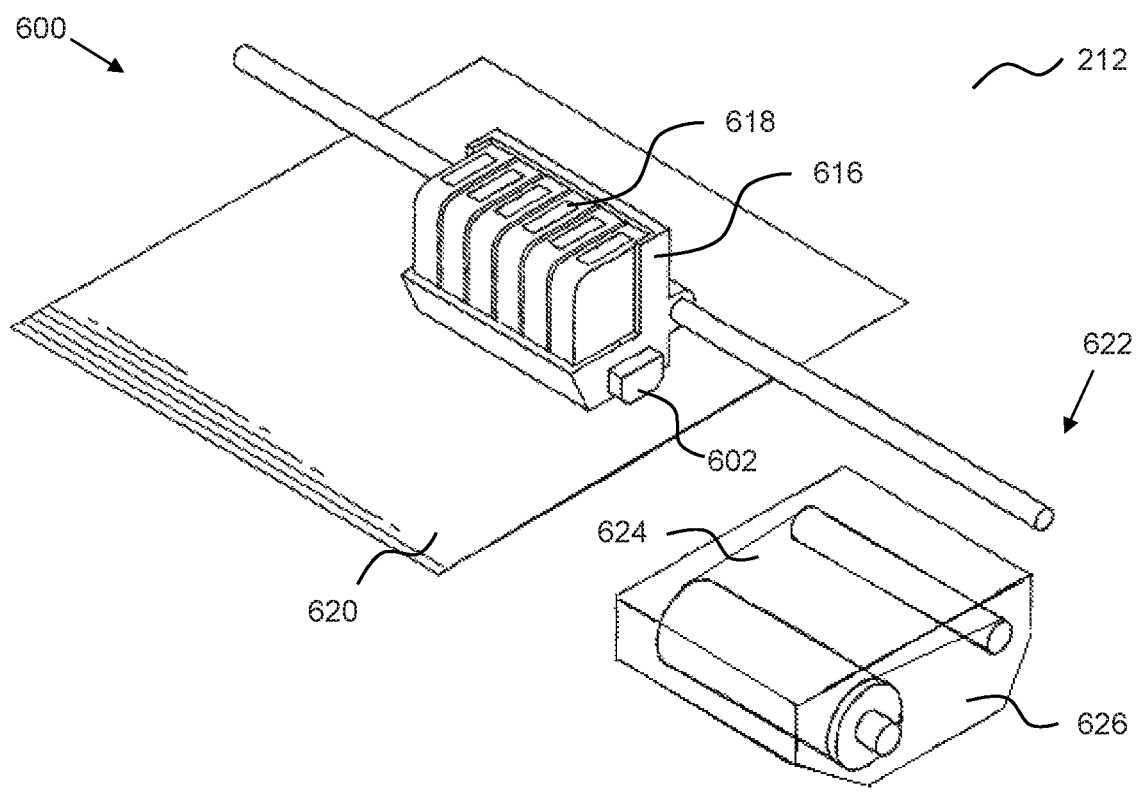
FIG. 6B is a schematic representation of another example printing apparatus.

FIGS. 6A and 6B show examples of a printing apparatus 600. The printing apparatus 600 comprises a surface inspection apparatus 602 and processing circuitry 604. The surface inspection apparatus 602 comprises a light source 606 to illuminate a portion of a surface (for example, a cleaning surface such as a web wipe, or printing substrate as described above), a first light detector 608 positioned to receive non-specularly reflected light from the portion of the surface, and a second light detector 610 positioned to receive specularly reflected light from the portion of the surface. The processing circuitry 604 comprises a comparison module 612 to compare an output of the first light detector 608 and an output of the second light detector 610 and a quality module 614 to evaluate if the surface meets a quality criterion or criteria based on the comparison. The surface inspection apparatus 602 may comprise any of the features of the inspection apparatus 100, 200, 300 described above and/or may carry out any of the blocks of the methods of FIG. 4 or FIG. 5.

The printing apparatus 600 in this example prints images by ejecting printing liquid from nozzles of a printhead, and in this example comprises an inkjet printer. The printhead may be an integral part of such a printing apparatus or may be a replaceable component. Similarly, printing liquid may be supplied by cartridges 618 which may be replaceable components of the print apparatus 600. In some examples the printhead is formed as part of the printing liquid cartridge 618.

In this example, the printing apparatus 600 comprises a movable carriage 616 on which the surface inspection apparatus 602 is mounted. The movable carriage 616 allows the surface inspection apparatus 602 to inspect different parts of a surface, or different surfaces. The moveable carriage 616 may also allow the surface inspection apparatus 602 to inspect other parts of the print apparatus 600 and/or to inspect consumables such as print media 620. In some examples the surface inspection apparatus 602 is capable of inspecting print media 620 to determine the type of print media 620, for example it may determine the gloss of the print media 620 or the thickness of the print media 620. The surface inspection apparatus 602 may inspect printing liquid deposited on a surface such as a print media 620 to perform printhead alignment, swath height error correction, print quality inspection and/or color calibration, wherein color calibration includes color, hue and intensity compensation.

The moveable carriage 616 in this example is a carriage for receiving printing liquid cartridges 618 and printheads. The printheads may be removable and replaceable from the carriage 602 or may be permanently mounted on the carriage 616. The carriage 616 is moveable, in use of the print apparatus 600, in a first direction to print a swath of printing liquid on a print substrate, and the substrate advances in a second direction perpendicular to the first direction to allow printing of multiple parallel swaths of printing liquid so an image may be printed on the print substrate 620. The carriage 616 is also movable, in use of the print apparatus 600, to a service area 622, where a cleaning surface 624 is present to clean the printheads. Additionally, the service area may comprise a spittoon into which printing liquid is ejected from printheads in a process called 'spitting'. Spitting is performed to maintain health of printheads by removing dry printing liquid or contaminants from the printheads. As the surface inspection apparatus 602 is located on the carriage 616 it is also moveable to the service area 622 which allows the surface inspection apparatus 602 to perform inspection in the service area, for example inspection of a cleaning surface 624 such as a web wipe. The web wipe may be located in a replaceable cassette 626 to allow replacement of the web wipe when it has been used. By using the same apparatus to inspect printing or printed substrates and cleaning surfaces, the complexity of the apparatus may be reduced.

The present disclosure is described with reference to flow charts and/or block diagrams of the method, devices and systems according to examples of the present disclosure. Although the flow diagrams described above show a specific order of execution, the order of execution may differ from that which is depicted, Blocks described in relation to one flow chart may be combined with those of another flow chart. It shall be understood that blocks in the flow charts and/or block diagrams, as well as combinations of the blocks in the flow charts and/or block diagrams can be realized by machine readable instructions.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the comparison module 110, 308, quality module 112, 310, thickness determination module 312, defect detection module 314, color module 316 and the type module 318) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors. Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A surface inspection apparatus comprising:
a light source to illuminate a portion of a surface in a print apparatus, wherein the surface is the surface of a web wipe for cleaning a printhead of the print apparatus;
a light detection apparatus to receive diffusely reflected light and specularly reflected light from the portion of the surface, wherein the light detection apparatus comprises a detection element for detecting the specularly reflected light; and
processing circuitry comprising:
a comparison module to determine a relationship between an intensity of detected diffusely reflected light and the detected specularly reflected light; and
a quality module to evaluate if the surface meets a quality criterion based on the relationship.

2. An apparatus as claimed in claim 1 wherein the quality module is to determine if the surface meets a quality criterion by determining a distance between the apparatus and the portion of the surface using the relationship between the intensity of the detected diffusely reflected light and the detected specularly reflected light.

3. An apparatus as claimed in claim 2 wherein the processing circuitry further comprises:
a thickness determination module to determine the thickness of the surface based on the determined distance between the apparatus and the portion of the surface.

4. An apparatus as claimed in claim 1 wherein the processing circuitry further comprises:
a defect detection module to detect a presence of a defect on the surface by detecting changes in the relative intensity of the diffusely reflected light and the detected specularly reflected light for different surface portions.

5. An apparatus as claimed in claim 1 wherein the light source is an LED.

6. An apparatus as claimed in claim 5 wherein the light source is a plurality of LEDs and different LEDs of the plurality of LEDs produce different colors of light.

7. An apparatus as claimed in claim 6 wherein the processing circuitry further comprises at least one of:
a color module to determine a color of a substrate or printing liquid on a printed substrate based on an output of the light detection apparatus; and
a type module to determine a type of the substrate based on the output of the light detection apparatus.

8. A method comprising:
illuminating a portion of a cleaning surface in a print apparatus, wherein the cleaning surface is the cleaning surface of a web wipe for cleaning a printhead of the print apparatus;
detecting diffusely reflected light from the illuminated portion;
detecting specularly reflected light from the illuminated portion; and
determine a relationship between the intensity of the diffusely reflected light and the intensity of the specularly reflected light to evaluate a condition of the cleaning surface.

9. A method as claimed in claim 8 further comprising:
monitoring the condition of the cleaning surface as the cleaning surface is driven past a detection apparatus.

10. A method as claimed in claim 8 wherein evaluating the condition comprises:
determining the relative intensity of the detected specularly reflected light and the diffusely reflected light; and
determining a distance between a detection apparatus and the cleaning surface based on the determined relative intensity.

11. A method as claimed in claim 10 further comprising:
determining, based on the distance, an indication of a thickness of the cleaning surface; and
comparing the determined thickness to predetermined criterion.

12. A method comprising:
illuminating a portion of a cleaning surface in a print apparatus;
detecting diffusely reflected light from the illuminated portion;
detecting specularly reflected light from the illuminated portion; and
determine a relationship between the intensity of the diffusely reflected light and the intensity of the specularly reflected light to evaluate a condition of the cleaning surface, wherein evaluating the condition of the cleaning surface comprises identifying a change in an angle of reflection of the specularly reflected light.

13. A printing apparatus comprising:
a surface inspection apparatus comprising:
a light source to illuminate a portion of a surface, wherein the surface is the surface of a web wipe for cleaning a printhead;
a first light detector positioned to receive non-specularly reflected light from the portion of the surface; and
a second light detector positioned to receive specularly reflected light from the portion of the surface; and
processing circuitry comprising:
a comparison module to compare an output of the first light detector and an output of the second light detector; and
a quality module to evaluate if the surface meets a quality criterion based on the comparison.

14. A printing apparatus as claimed in claim 13, further comprising:
a movable carriage on which the surface inspection apparatus is mounted.

* * * * *